United States Patent [19]

Posey et al.

[11] Patent Number: 4,476,189
[45] Date of Patent: Oct. 9, 1984

[54] COPOLYESTER PRIMED POLYESTER FILM

[75] Inventors: Robert G. Posey, Taylors; Edwin C. Culbertson, Greer, both of S.C.

[73] Assignee: American Hoechst Corporation, Somerville, N.J.

[21] Appl. No.: 495,192

[22] Filed: May 16, 1983

[51] Int. Cl.$^3$ ............................................. B32B 27/06
[52] U.S. Cl. .................................... 428/336; 428/480; 428/910; 428/483; 430/160
[58] Field of Search ............... 428/480, 483, 910, 482, 428/336; 430/160, 533; 528/295

[56] References Cited

U.S. PATENT DOCUMENTS 3,779,993 12/1973 Kibler et al. ..................... 528/295
4,252,885 2/1981 McGrail et al. ................... 430/160
4,304,851 12/1981 McGrail et al. ................... 430/160

*Primary Examiner*—George F. Lesmes
*Assistant Examiner*—B. Johnson
*Attorney, Agent, or Firm*—Michael J. Tully; James R. Cartiglia

[57] ABSTRACT

A primer coated, oriented polyester film material is provided wherein the primer is applied in an aqueous medium comprising a water dispersible copolyester consisting essentially of the condensation product of components A, B, C, and D or their polyester forming equivalents as follows:

(A) about 60 to 75 mole percent of terephthalic acid;
(B) about 15 to 25 mole percent of at least one dicarboxylic acid of the formula $HOOC(CH_2)_nCOOH$, wherein n ranges from about 1–11;
(C) greater than from about 6 up to about 15 mole percent of at least one sulfomonomer containing an alkali metal sulfonate group attached to a dicarboxylic aromatic nucleus, and
(D) stoichiometric quantities, i.e., about 100 mole percent of at least one aliphatic or cycloaliphatic alkylene glycol copolymerizable therewith having about from 2 to 11 carbon atoms.

The copolyester priming layer may be applied to the polyester film at any suitable stage during manufacture of the film, i.e., before or during the stretching operations. The resultant primed polyester film is found to provide excellent adhesion to many aqueous or organic solvent based coatings subsequently applied thereto.

14 Claims, No Drawings

COPOLYESTER PRIMED POLYESTER FILM

The present invention relates to oriented polyester film coated on one or both sides with a prime coating which renders the polyester film surface receptive to additional coating or printing from aqueous or organic solvent based systems.

BACKGROUND OF THE INVENTION

Oriented polyester film, particularly biaxially oriented film composed of polyethylene terephthalate (PET), is widely used as a base for drafting film, photographic film and reprographic film, as well as for packaging and labelling applications.

Because PET film is hydrophobic and is not readily receptive to coating or printing, in most applications where the film is to serve as a base or support for other coatings, it must be first coated on one or both sides with a primer coating which adheres to the film and is receptive as well to other coatings applied to it. For example, U.S. Pat. Nos. 2,627,088 and 2,698,240 teach a primer coating for PET film comprising a terpolymer composition of vinylidene chloride, acrylic ester and itaconic acid. This primer layer is said to have excellent adhesion to the polyester surface and to water or alcohol based photographic gelatin layers subsequently coated thereon.

U.S. Pat. No. 3,447,947 teaches a drafting film comprising a PET film base coated with a primer layer which may comprise, inter alia, an organic solvent-soluble mixed isophthalic polyester or polyester-amide or polyester oxazoline. Such layers are said to provide good adhesion to both the polyester base film and to hydrophobic film forming drafting layers applied from organic solvent and containing finely divided toothing agents such as silica, as well as to photographic silver halide emulsion layers and light sensitive diazo layers. However, the application of such coatings by the film manufacturer is not particularly attractive because of the requirement that they be applied as solutions or dispersions in organic solvent. Health and safety factors dictate against the in-plant utilization of organic solvents in coating processes undertaken during film manufacture.

Other primer layers include the thermoset acrylic or methacrylic layers taught in U.S. Pat. No. 3,819,773 which can be applied to the PET film in the plant from aqueous medium. However, these primer layers suffer the disadvantage that they do not provide commercially adequate adhesion for aqueous based coatings such as aqueous printing inks or aqueous matte drafting layers applied directly to them.

Compositions containing certain water dispersible or water soluble copolyesters and copolyester amides have been developed which are taught to be useful as adhesives for various substrates, including metals, papers and polyester film, or as binders or sizing agents for synthetic fibers. Such materials are disclosed in U.S. Pat. Nos. 3,563,942 and 3,779,993. Aqueous dispersions of similar materials are also disclosed in U.S. Pat. No. 4,340,519, which materials comprise copolyester compositions containing the polyester reaction product of an aromatic dicarboxylic acid, an aliphatic dicarboxylic acid, an aromatic dicarboxylic acid containing a metal sulfonate group and polyol components, said composition further containing a water soluble organic compound having a boiling point of 60° C. to 200° C. Such copolyesters are preferably a blend of crystalline and non-crystalline copolyesters. These materials are disclosed to have utility as hot melt adhesives, coatings and binders for plastic fibers or films, including polyester plastics.

More recently, water soluble or dispersible copolyesters of a type similar to those described in U.S. Pat. Nos. 3,563,942 and 3,779,993 above have been disclosed as primer layers for PET film to improve the adhesion to the film of photosensitive layers. For example, U.S. Pat. Nos. 4,252,885 and 4,304,851 teach a priming layer applied to PET film as an aqueous dispersion comprising a polyester having free-functional acid groups derived from the condensation of one or more glycols with one or more tri-functional organic acids. Such primers are disclosed to enhance the adhesion of photographic layers to PET film. European publication No. 0029620 teaches a PET priming layer useful for gelatin based photosensitive coatings, which primer is based on an aqueous dispersion of the condensation product of ethylene glycol and a mixture of terephthalic acid, isophthalic acid and a salt of sulfoisophthalic acid. U.S. Pat. No. 4,181,528 teaches that the adhesion of hydrophilic photographic emulsions to PET film is enhanced by the application to the film of a sub-coating comprising an aqueous dispersion of gelatin, a water soluble polyester similar to those discussed above and a polyfunctional aziridine crosslinking agent.

While these and other priming layers or sublayers are effective in enhancing the adhesive qualities of PET film for certain applications, there are limitations. For example, whereas many thermoplastic or thermoset acrylic or methacrylic primers may provide suitable adhesion to photographic or printing lacquer compositions containing organic solvents, such primers do not provide commercially satisfactory adhesion to many aqueous based coatings or printing inks without the application of a second priming or subbing layer over the first primer. Conversely, many of the water dispersible polyester primers referred to above may provide satisfactory adhesion directly to aqueous or alcohol based systems, but will not provide commercially satisfactory adhesion directly to organic solvent based lacquers and printing inks. Thus the PET film manufacturer often must make available several different types of film each primed with a different primer class or composition to satisfy the differing requirements of his customers. The development of a primer material which would render PET film surfaces receptive to both aqueous and organic solvent coatings or printings applied directly to the primed film surface would be of great significance to the film manufacturer.

Accordingly, it is an object of this invention to provide an oriented self-supporting polyester film material receptive to aqueous and organic solvent based coatings.

Another object of this invention is to provide a primer coating for oriented polyester film material which can be safely and easily applied in the plant during production of the film, and to provide a primed film which can be successfully reclaimed in the plant.

Another object is to provide a prime coated biaxially oriented polyethylene terephthalate film material which is receptive to the application of a broader class of aqueous and organic solvent based printing inks and coatings.

A further object is to provide a copolyester primer material of specific composition which renders polyester film primed therewith commercially acceptable for broader reprographic, drafting and printing applications.

SUMMARY OF THE INVENTION

These and other objects of the invention may be achieved by the provision of a prime coated oriented polyester film material wherein the primer is applied in an aqueous medium comprising a water dispersible copolyester consisting essentially of the condensation product of components A, B, C and D or their polyester forming equivalents as follows:
  (A) about 60 to 75 mole percent of terephthalic acid;
  (B) about 15 to 25 mole percent of at least one dicarboxylic acid of the formula $HOOC(CH_2)_nCOOH$, wherein n ranges from about 1–11;
  (C) greater than from about 6 up to about 15 mole percent of at least one sulfomonomer containing an alkali metal sulfonate group attached to a dicarboxylic aromatic nucleus, and
  (D) stoichiometric quantities, i.e., about 100 mole percent of at least one aliphatic or cycloaliphatic alkylene glycol copolymerization therewith having about from 2 to 11 carbon atoms.

The copolyester priming layer may be applied to the polyester film at any suitable stage during manufacture of the film, i.e., before or during the stretching operations. The resultant primed polyester film is found to provide excellent adhesion to many aqueous or organic solvent based coatings subsequently applied thereto.

DETAILED DESCRIPTION OF THE INVENTION

The preferred oriented polyester film base for the purposes of this invention is made from polyethylene terephthalate, although the invention is equally applicable to film based on a crystallizable polyester resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus. For example, the polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where necessary, the film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range of from about 215° C. and 235° C.

The copolyester primer coating of this invention in the form of an aqueous dispersion may be applied in-line at one of two stages during the film manufacture: the pre-draw stage at the point between the casting of the amorphous sheet and the first stretch such as disclosed, for example, in British Pat. No. 1,411,564 or the inter-draw stage subsequent to the uniaxial drawing but prior to biaxial drawing such as disclosed, for example, in U.S. Pat. No. 4,214,035. Normally, the heat applied to the film during the stretching or final conditioning stages is sufficient to evaporate off the water and other volatiles and dry the primer coating.

In one preferred embodiment, the primer coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, after longitudinal stretching, the film is coated by any of the well known techniques employed in the art. For example, coating may be effected by roller coating, spray coating, slot coating or immersion coating. In a preferred embodiment, the polyester film is coated by means of gravure roller coating. Also, the uniaxially drawn film is preferably subjected to a corona discharge by a corona discharge apparatus prior to coating as is known in the art. The discharge treatment decreases the hydrophobic character of the polyester film surface, which permits the water based coating to more easily wet the surface and thus improve the adhesion of the coating to the surface.

As indicated above, the copolyesters of this invention suitable as primer coatings for polyester film are produced by polycondensing (A) terephthalic acid, (B) an aliphatic dicarboxylic acid having the formula $HOOC(CH_2)_nCOOH$, n being 1–11; (C) a sulfomonomer containing an alkali metal sulfonate group attached to a difunctional dicarboxylic aromatic nucleus, and (D) at least one aliphatic or cycloaliphatic alkylene glycol having from about 2 to 11 carbon atoms. The total acid equivalents present should be substantially equal to the total glycol equivalents on a molar basis.

Examples of dicarboxylic acids suitable as component (B) of the copolyesters include malonic, adipic, azelaic, glutaric, sebacic, suberic, succinic, brassylic acids and mixtures thereof, or their polyester forming equivalents.

Examples of sulfomonomers containing a metal sulfonate group attached to a dicarboxylic aromatic nucleus (component C) are those materials generally represented by the formula:

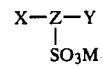

wherein:
  M is a monovalent cation of an alkali metal;
  Z is a trivalent aromatic radical; and
  X and Y are carboxyl groups or polyester forming equivalents.

Such monomers are disclosed in U.S. Pat. Nos. 3,563,942 and 3,779,993, incorporated herein by reference. Species of such monomers include sodium sulfoterephthalic acid; sodium 5-sulfoisophthalic acid; sodium sulfophthalic acid; 5-(p-sodiosulfophenoxy)-isophthalic acid; 5-(sulfopropoxy) isophthalic acid, sodium salt; and like materials as well as their polyester forming equivalents, such as the dimethyl esters. Preferably M is $Na^+$, $Li^+$ or $K^+$.

The term "polyester forming equivalent" as used herein means reactants having groups capable of undergoing condensation reactions to form polyester linkages, which groups include carboxylic groups as well as lower alkyl esters thereof, e.g., dimethyl terephthalate, diethylterephthalate and many other corresponding esters, halides or salts.

Examples of glycols suitable as component D include ethylene glycol; 1,5-pentanediol; 1,6-hexanediol; neopentyl glycol; 1,10-decanediol; cyclohexane dimethanol; and similar materials. Preferably the glycol should be aliphatic or cycloaliphatic, with no ether linkages in the molecular chain. Ethylene glycol is the much preferred glycol.

The copolyesters may be prepared by well known polymerization means. The general procedure is to combine the acid components with the glycol and heat in the presence of an esterification catalyst, with the subsequent addition of a polycondensation catalyst.

It has been found that the relative proportions of the components (A), (B), (C), and (D) which are employed in making the polyester primers of this invention are critical in achieving a primed film offering satisfactory adhesion to both aqueous and solvent based coatings. Also, the identity of these components is critical and thus the term "consisting essentially of" is meant to exclude from the composition those materials in amounts significant enough to seriously detract from the adhesion properties of the primer with respect to solvent and aqueous coatings applied thereto. For example, terephthalic acid (component A) must be present within the about 60 to 75 mole percent range on the acid side. Also, the presence of more than about 15 mole percent of another aromatic acid such as isophthalic acid, has been found to seriously detract from the adhesion of the primer to solvent based coatings. Ideally component (A) is relatively pure terephthalic acid present at a target level of about 70 mole percent.

As to component (B), any acid within the formula set forth above will provide satisfactory results, with the preferred acids being adipic, azelaic, sebacic, malonic, succinic, glutaric and mixtures thereof. The target level within the range set forth is 20 mole percent on the acid side.

With regard to component (C), the lower limit of greater than about 6 mole percent of this monomer is required in this system to impart water dispersibility to the primer. The preferred range for this material is about 6.5 to 10 mole percent, with 7 to 7.5 mole percent being the most preferred range.

On the glycol side, this material is present in approximately stoichiometric quantities. It has been found that oxyalkylene glycols, such as diethylene glycol, have a detrimental effect on the adhesion of the primer to solvent based coatings. For example, the presence of 5 mole percent or greater of diethylene glycol based on 100 mole percent glycol is to be avoided. Ideally, the glycol component is present in relatively pure form.

In the synthesis of the copolyester primer coatings of this invention, it is most preferred to employ all of the starting diacid monomers in their lower dialkyl ester form, particularly in the dimethyl ester form. This allows more consistent control of the formation in-situ of dialkylene glycols, e.g., diethylene glycol when the glycol reactant is ethylene glycol. As pointed out above, the presence of significant amounts of such materials in the copolyester composition detracts from the good adhesive properties of the primer layers. For the same reason the sulfomonomer is employed as the alkali metal salt rather than as the free sulfonic acid.

The copolyester coatings suitable for the purposes of this invention may be further characterized as having an acid number of less than 10, preferably from about 0 to about 3, a number average molecular weight of less than about 50,000, and an RV (relative viscosity measured as a 1% solution in dichloro acetic acid at 25° C. using an Ubbelohde Capillary Viscometer) within the range of about 300 to 700, more preferably in the range of about 350 to 650.

As indicated above, the primer coating of the present invention is applied to the base polyester film as an aqueous dispersion and at a solids concentration within the range of about 0.5 to 15%, preferably about 3 to 10%. The preferred solids level is such as to yield a final dry coating thickness within the range of about $10^{-7}$ to $10^{-5}$ inch, which translates into a solids level on a weight basis of from 0.00305 $g/m^2$ to 0.305 $g/m^2$. The preferred thickness range of the dried copolyester prier is from $8.0 \times 10^{-7}$ to $2.0 \times 10^{-6}$ inch, with $1.25 \times 10^{-6}$ inch being the target thickness.

The coating may be applied to one or both sides of the film, or it may be applied to one side and a different coating such as a thermosetting acrylic or methacrylic coating applied to the opposite side, such as taught in U.S. Pat. No. 4,214,035. In some cases, it may be desirable to include a hardening agent in the copolyester coating formulation, e.g., from about 1-20% by weight of a melamine or urea/formaldehyde condensation product, to further modify the properties of the primer coating. Other additives known in the art may also be present in the coating formulation such as anti-static agents, wetting agents, surfactants, pH regulating agents, anti-oxidants, dyes, pigments, slip agents such as colloidal silica, and the like.

The copolyester primer coatings of this invention exhibit excellent heat stability and accordingly any scrap primed film made during production can be mixed with fresh polyester, re-melted and re-fed to the film-forming extruder to produce oriented film. Such film produced containing up to about 70% by weight of coated scrap reclaim exhibits good quality, color and appearance with very little if any perceptible degradation of properties due to the presence of the coating impurity. Thus the primed film of this invention offers a distinct commercial advantage to the film manufacturer over many other primed films, such as films primed with vinylidene chloride containing polymers as disclosed in U.S. Pat. Nos. 2,627,088 and 2,698,240, which tend to degrade and discolor when reclaimed as set forth above.

Polyester film primed with the copolyester composition of this invention has excellent utility as a film base for the production of photosensitive reprograhic films. Such films are prepared by forming a coating on a surface of the primed polyester film of a photosensitive composition comprising an organic solvent solution of a resinous binder containing or impregnated with a light sensitive diazonium compound, and drying said coating. Resinous binders suitable for this purpose include cellulose acetate butyrate, cellulose acetate, cellulose acetate propionate as well as vinyl polymers such as polyvinyl acetate. Suitable solvents include acetone, methyl ethyl ketone, methyl isobutyl ketone, ethylene glycol monomethyl ether and mixtures thereof. These reprographic coatings and their method of application and use are well known in the art.

Similarly the primed polyester film of this invention forms an excellent substrate for the application of matte coatings which render the film suitable for use as a drawing or drafting material. These matte coatings may be based on either an aqueous or organic solvent composition comprising a resinous binder and a finely divided particulate material which serves as a "toothing agent". The resinous binder may include the resinous materials referred to above as well as acrylic or methacrylic resins. The organic solvents may also include those listed above. Particulate materials include finely divided (less than 10 micron particle size) clays or silica. Water dispersible or water soluble binders such as polyvinyl alcohol or hydrolyzed polyvinyl acetate may also be employed. Other ingredients such as thickeners or dispersing agents may also be present in such matte formulations. Similar matte formulations are disclosed for example in British Pat. No. 1,072,122.

Yet another application of the primed film of this invention is as a packaging or label material. The primed films are both heat sealable and demonstrate improved adhesion to aqueous and organic solvent based printing inks when compared with unprimed film. These inks may comprise aqueous/alcohol dispersions or solutions of pigments and or dyes in combination with crylic resins and thickening agents, or organic solvent dispersions or solutions of such dyes or pigments in combination with resinous materials.

In yet another embodiment of the invention, the copolyester primer layer has been found to provide improved adhesion between monoaxially oriented polyester film and layers of polyvinyl alcohol or polyurethane resins applied thereto such as are used in the manufacture of polarizers and as disclosed in copending U.S. patent application Ser. No. 324507, filed Nov. 24, 1981, the disclosure of which is incorporated herein by reference. In such embodiment the copolyester coating is applied to the surface of a quenched amorphous polyester moving web prior to any stretching, the coating is dried, an aqueous dispersed polyvinyl alcohol coating is then applied directly onto the dried, coated copolyester surface layer of the moving web, and the web is then stretched in a single direction transverse to the direction of motion of the web while simultaneously heating the web at a temperature of from about the glass transition temperature of the polyester to about 160° C. The web is then crystallized and cooled as described above, and may subsequently be used for forming lamminates with polyvinyl alcohol film as is known in the production of polarizers.

Accordingly the excellent adhesive qualities of polyester film primed with the copolyester layers of this invention to both aqueous based and organic solvent based coatings applied thereto renders such film of more universal utility to the manufacturer of finished reprographic, graphic and packaging products.

These adhesive qualities are illustrated in Table 1 using four tests, i.e., a test employing a conventional organic solvent reprographic lacquer (Repro), a test employing an aqueous based matte formulation (Matte), and two test involving aqueous and organic solvent based pigmented ink formulations. (Soluble and Aqueous Printing Inks.)

The Repro test was conducted using a lacquer comprising (in parts by weight) 9 parts cellulose acetate butyrate of "20 second" grade dissolved in a mixture of 88 parts ethylene glycol monomethyl ether (methyl cellosolve) and 3 parts methyl ethyl ketone with Rhodamine B dye added for color (3 parts of a 1% Rhodamine B dye in n-butanol). The lacquer was applied to the copolyester coated surface of the film by means of a wire-wound bar, Meyer rod No. 70, and cured in an oven for 5 minutes at 60° C. The coating was scored with a cross-hatched pattern by means of a scalpel. A strip of adhesive tape (Scotch tape 610) was adhered to the cross-hatched area, rubbed with a fingernail to insure intimate contact and then pulled rapidly from the film. The amount of lacquer remaining in the cross-hatched area was expressed as a percentage of this amount, i.e. no lacquer removed=100% adhesion, all lacquer removed=0% adhesion with intermediate adhesion values being assessed in terms of the proportion of lacquer area remaining adhered to the film. The test was done twice on two sheets (total of 4 areas tested) and the adhesion value reported as that of the test area showing the most failure.

The Matte test was conducted using a matte coating based on a crosslinking polyvinyl alcohol dispersed as a 10% by weight solution in water. The composition also contains finely divided silica dispersed therein and a surfactant. The coating was applied to the copolyester coated surface of the film by means of a wire-wound bar, Meyer rod No. 50, cured in an oven for 5 minutes at 140° C., and allowed to cool. The adhesion of the coating to the film was determined as in the case of the Repro test above.

Repro and Matte adhesion test results demonstrating 95% adhesion or less are not generally considered acceptable by commercial standards. Results of greater than 95% to less than 100% are considered reasonably acceptable, while test results demonstrating 100% adhesion are the target standard for commercial acceptability.

The Printing Ink Test was conducted using three different solvent based ink formulations containing solutions of nitrocellulose binder in two cases and a solution of polyamide resin in a third case, and one aqueous based ink containing an acrylic resin. Each of these formulations contained 10% by weight finely ground pigment. The inks were printed on flat sheets of the film by means of an offset gravure roller comprising a 180 quadrangular engraved cylinder. Each printed sheet was dried for at least one minute at 140° F. Adhesion was evaluated by pressing a strip of adhesive tape (Scotch 610 tape) over the printing, rubbing the tape firmly, and rapidly removing the tape. Because this test is a relative one, adhesion results are reported in comparison to a control sample of biaxially oriented polyethylene terephthalate film which is not primer coated but which is printed using the same techniques. The results in the Table are expressed as the approximate area of printing remaining for each sample tested vs. the control, i.e., 2× means twice as much printing ink remaining, 15× means fifteen times as much printing ink remaining, and so forth. Results in terms of the three inks based on organic solvent vehicles are expressed as an average of the three samples tested.

The following examples are illustrative of the invention.

EXAMPLE 1

A water dispersible copolyester containing on the acid side approximately 73 mole percent terephthalic, 20 mole percent adipic and 7 mole percent of the sodium salt of 5-sulfoisophthalic, and on the glycol side 100 mole percent ethylene glycol was prepared by the following procedure.

A 2-liter, stainless steel reaction flask, equipped with an anchor stirrer, a thermocouple to measure the temperature of the vessel contents, an 18-inch Claisen/Vigreaux distillation column with a condenser and a receiver flask, an inlet port, and a heating mantle was preheated to 190° C., swept with nitrogen, and charged with 907.3 g of dimethyl terephthalate, 223.0 g of dimethyl adipate, 132.7 g of dimethyl-5-sulfoisophthalate-sodium salt and 794.5 g of ethylene glycol. A buffer ($Na_2CO_3.10H_2O$-3.577 g) and a transesterification catalyst (Mn $(OAc)_2.4H_2O$-0.563 g) were added. The mixture was stirred and heated while methanol distilled from the flask. During the distillation, the vessel temperature was gradually raised to 250° C. When the weight of distillate was the same as the theoretical methanol yield, an ethylene glycol solution containing 0.188 g. of phosphorous acid was added. The distillation column was replaced with a gooseneck vapor takeoff with a receiver. Ethylene carbonate (20 g) was added (neat) to the reaction mixture, and vigorous off-gassing ($CO_2$) started immediately. The $CO_2$ evolution subsided after about 10 minutes. A 240 mm Hg vacuum was applied, and the polycondensation catalyst (0.563 g $Sb_2O_3$ in an ethylene glycol slurry) was added. The mixture was stirred under 240 mm Hg vacuum for 10 minutes, after which the pressure was reduced from 240 mm Hg to 20 mm Hg in 10 mm Hg/minute increments. With the system at 20 mm Hg vacuum, the vessel temperature was raised from 250° C. to 290° C. at a rate of 2° C./minute. When the vessel temperature reached 290° C., the stirrer speed was reduced, and the pressure was lowered to 0.1 mm Hg or less. At that point a stirrer motor ammeter reading was obtained. The viscosity of the polymer was controlled by allowing the polycondensation to proceed to fixed values for the change in stirrer motor amps ($\Delta A$) of 5 amps. After the desired molecular weight was attained, nitrogen was used to pressurize the vessel and to force the molten polymer out of the bottom plug of the vessel into an ice water quench bath.

An aqueous dispersion of the copolyester prepared in accordance with Example 1 was made by adding 60 g. of the copolyester in granular form to one liter of water maintained at about 90° C. in a two liter stainless steel beaker under conditions of vigorous stirring. After the copolyester was completely dispersed, it was cooled to room temperature, filtered, after which 1.12 g. of a 50% solids aqueous dispersion of colloidal silica was added under mixing conditions.

This dispersion was then applied as a primer to polyester film by the following procedure:

Polyethylene terephthalate polymer was melted and extruded through a slot die onto a casting drum maintained at a temperature of about 20° C. The melt froze to form a cast sheet. The cast sheet was longitudinally stretched at a draw ratio of approximately 3.6:1 while maintained at a temperature of about 80° C.

The longitudinally drawn film was corona treated by a corona discharge apparatus and thereinafter coated with the copolyester dispersion prepared above by reverse gravure coating.

The corona treated, longitudinally drawn, coated film was dried at a temperature of about 100° C. Thereafter, the film was stretched, in the transverse direction at a draw ratio of 3.6:1 to produce a biaxially drawn film. The biaxially drawn film was heat set at a temperature of 230° C. The dry weight of the coating was about 0.038 g/m² with a coating thickness of $1.24 \times 10^{-6}$ inch.

In the same manner as set forth in Example 1, eight additional copolyester formulations within the scope of this invention and having compositions as set forth in Table 1 were prepared (Examples 2–9), were dispersed in water and were coated on polyester film by the techniques set forth above. All final coating thicknesses on a dry weight basis were approximately $1 \times 10^{-6}$ inch.

These primed films were evaluated for Repro, Matte and Printing Ink adhesion by the test methods set forth above. Results are reported in Table 1.

TABLE 1

| | ACID | Mole % | Glycol | Mole % | RV | Repro | Matte | Printing Ink SOL | AQ |
|---|---|---|---|---|---|---|---|---|---|
| Ex. 1 | Terephthalate(a) | −73 | EG(c) | −100 | 583 | 100% | 100% | 4.5X | 14X |
| | Adipate(a) | −20 | | | | | | | |
| | SIPA (b) | −7 | | | | | | | |
| Ex. 2 | Terephthalate | −70 | EG | −100 | 493 | 100% | 95% | 3X | 19X |
| | Adipate | −20 | | | | | | | |
| | SIPA | −10 | | | | | | | |
| Ex. 3 | Terephthalate | −70 | EG | −100 | 384 | 100% | 100% | 4X | 3X |
| | Malonate | −20 | | | | | | | |
| | SIPA | −10 | | | | | | | |
| Ex. 4 | Terephthalate | −73 | EG | −100 | 567 | 100% | 100% | 4X | 10X |
| | Glutarate | −20 | | | | | | | |
| | SIPA | −7 | | | | | | | |
| Ex. 5 | Terephthalate | −70 | EG | −100 | 499 | 100% | 100% | 4X | 18X |
| | Azelate | −20 | | | | | | | |
| | SIPA | −10 | | | | | | | |
| Ex. 6 | Terephthalate | −70 | EG | −100 | 395 | 100% | 100% | 3X | 19X |
| | Sebacate | −20 | | | | | | | |
| | SIPA | −10 | | | | | | | |
| Ex. 7 | Terephthalate | −73 | EG | −100 | 538 | 100% | 99% | 5X | 19X |
| | αMethyl | | | | | | | | |
| | Succinate | −20 | | | | | | | |
| | SIPA | −7 | | | | | | | |
| Ex. 8 | Terephthalate | −60.5 | EG | −100 | 502 | 100% | 100% | 5X | 19X |
| | Isophthalate | −11.2 | | | | | | | |
| | Adipate | −20.6 | | | | | | | |

TABLE 1-continued

| | ACID | Mole % | Glycol | Mole % | RV | ADHESION Repro | Matte | Printing Ink SOL | AQ |
|---|---|---|---|---|---|---|---|---|---|
| Ex. 9 | SIPA<br>Terephthalate<br>Adipate | −7.7<br>−72.5<br>−20 | EG<br>NPG(d) | −75<br>−25 | 666 | 100% | 99% | 4.5X | 15X |
| Ex. 10C | SIPA<br>Terephthalate<br>Isophthalate | −7.5<br>−80<br>−10 | EG | −100 | 415 | 10% | 50% | NT | NT |
| Ex. 11C | SIPA<br>Terephthalate | −10<br>−85 | EG | −100 | 363 | 25% | 50% | 4X | 19X |
| Ex. 12C | SIPA<br>Terephthalate<br>Adipate | −15<br>−80<br>−10 | EG | −100 | 508 | 90% | 50% | NT | NT |
| Ex. 13C | SIPA<br>Terephthalate<br>Adipate | −10<br>−60<br>−30 | EG | −100 | 499 | 50% | 90 | NT | NT |
| Ex. 14C | SIPA<br>Isophthalate<br>Adipate | −10<br>−70<br>−20 | EG | −100 | 491 | 25% | 85% | 3X | 19X |
| Ex. 15C | SIPA<br>Terephthalate<br>Isophthalate<br>Adipate | −10<br>−45.4<br>−26.2<br>−20.6 | EG | −100 | 524 | 25% | NT | NT | NT |
| Ex. 16 | SIPA<br>Terephthalate<br>Isophthalate | −7.7<br>−53<br>−40 | EG | −100 | 541 | 0% | 75% | NT | NT |
| Ex. 17C | SIPA<br>Terephthalate<br>Adipate | −7<br>−70<br>−20 | EG<br>DEG(e) | −95<br>−5 | 520 | 75% | 95% | 3X | 19X |
| Ex. 18C | SIPA<br>Terephthalate<br>Adipate | −10<br>−70<br>−20 | EG<br>DEG | −80<br>−20 | 553 | 60% | 95% | NT | NT |
| Ex. 19C | SIPA<br>Terephthalate<br>Isophthalate<br>Azelate | −10<br>−30<br>−51<br>−45 | EG<br>DEG | −20<br>−80 | 663 | 75% | 10% | 1X | 1X |
| Ex. 20C | SIPA<br>Terephthalate<br>Adipate | −10<br>−74<br>−20 | EG | −100 | 602 | DID NOT ADEQUATELY DISPERSE | | | |
| Ex. 21C | SIPA<br>Terephthalate<br>Adipate | −6<br>−76<br>−20 | EG | −100 | 697 | DID NOT ADEQUATELY DISPERSE | | | |
| Ex. 22C | SIPA<br>TMA(f) | −4<br>−100 | EG<br>BA | −50<br>−50(g) | 224 | 0% | 25% | 4X | 19X |
| Ex. 23C | IPA(h)<br>TMA | −56.5<br>−43.5 | 1,4-B(i)<br>CHX(j) | −90<br>−10 | 171 | 90% | 75% | 4X | 19X |
| Ex. 24C | Eastman | MPS-7762 | | | | 10% | 90% | NT | NT |
| Ex. 25C | Eastman | WD-3652 | | | | 50% | 95% | NT | NT |
| Ex. 26C | Eastman | WNT-9519 | | | | 75% | 100% | NT | NT |

Notes:
(a) Dicarboxylates are all di-methyl esters.
(b) SIPA - dimethyl-5-sulfoisophthalate, sodium salt.
(c) EG - ethylene glycol.
(d) NPG - neopentyl glycol.
(e) DEG - diethylene glycol.
(f) TMA - trimellitic anhydride.
(g) BA - benzyl alcohol.
(h) IPA - isophthalic acid.
(i) 1,4-B - 1,4-butane diol.
(j) CHX - cyclohexanol.
RV - relative viscosity as 1% solution in dichloro acetic acid at 25° C.
NT - not tested.

Twelve comparative copolyesters were synthesized by the general method of Example 1, and were dispersed in water and coated on polyester film as set forth above. These are designated Examples 10C through 21C. The composition of these materials is set forth in Table 1.

With respect to Examples 22C and 23C, these copolyesters were prepared by the methods set forth in Examples 1 and 18 respective of U.S. Pat. No. 4,304,851.

In addition, three water dispersed copolyesters commercially available from Tennessee Eastman Corp. were coated on polyester film at the same solids level as used in Example 1. These are designated as Examples 24C through 26C.

Example 10C through 13C demonstrate the adverse effects on Repro and Matte adhesion with copolyester primers wherein the aliphatic dicarboxylic acid component is either absent or present outside of the disclosed ranges. Examples 14C and 15C demonstrate the adverse effects on Repro and Matte adhesion with copolyesters containing excessive amounts of isophthalic acid component. Example 17C and 18C illustrate the adhesion problems with copolyester primers containing 5% or greater diethylene glycol. Examples 16C and 19C through 26C illustrate adhesion problems with other copolyester primer compositions outside the scope of this invention.

None of the Examples 10C through 26C represent copolyester materials within the scope of this invention. These materials were evaluated for Repro, Matte and Printing Ink adhesion exactly as set forth above. The adhesion results are also recorded in Table 1.

As can be seen from the data in Table 1, all materials tested (excepting Example 19C) showed a varying degree of enhancement of printing ink adhesion to the polyester film. However, only the materials of Examples 1 through 9 also exhibited commercially satisfactory adhesion to both the Repro and Matte coatings applied thereto.

EXAMPLE 27

Molten polyethylene terephthalic was extruded onto a cold casting drum to form an amorphous film. The thus formed film was first coated with a 10% by weight solids aqueous dispersion of the copolyester described in Example 1, and the copolyester was dried using heat guns and a radiant heater. Next the dried surface was roller coated using a 10% by weight aqueous solution of polyvinylalcohol (Vinol 205 available from Air Products Corporation) to yield a coating weight, on a dry basis, of 0.10 dry pounds per thousand square feet of film. The film was then heated, while being stretched transversely to the longitudinal direction of its motion, at a temperature in the heating zone of from about 97° to 105° C. to an extent of four times its original width. The stretched film was then heated to a temperature in a heating zone of from 208° to 214° C. while transversely restrained to crystallize the film. The crystallized film was then cooled.

A two mil thick monoaxially oriented polyvinylalcohol film was laminated to the polyvinylalcohol surface of the film prepared above by passing the films through the nip of a pair of rollers while a water adhesive is applied between the films.

The laminate exhibited an improved resistance to delamination as compared with a control laminate in which the copolyester primer layer was not included.

What we claim is:

1. An oriented self-supporting polyester film having a continuous copolyester primer coating on one or both sides thereof, said polyester film prepared by melt extruding a substantially amorphous polyester film and thereafter orienting the film by stretching in one or two directions and heat setting the film, said copolyester primer coating being applied to said film as an aqueous dispersion prior to stretching in one direction or subsequent to stretching in one direction but prior to stretching in a mutually perpendicular direction, said copolyester primer coating consisting essentially of the polyester condensation product of the following monomers or their polyester forming equivalents:
   (A) about 60 to 75 mole percent of terephthalic acid;
   (B) about 15 to 25 mole percent of at least one aliphatic dicarboxylic acid of the formula $HOOC(CH_2)_nCOOH$, wherein n ranges from about 1–11;
   (C) greater than from about 6 up to about 15 mole percent of at least one sulfomonomer containing an alkali metal sulfonate group attached to a dicarboxylic aromatic nucleus, and
   (D) stoichiometric quantities of about 100 mole percent of at least one copolymerizable aliphatic or cycloaliphatic alkylene glycol having about from 2 to 11 carbon atoms.

2. The film of claim 1 wherein said primer coating has a dry thickness within the range of about $10^{-7}$ to $10^{-5}$ inch.

3. The film of claim 2 wherein said self supporting polyester film is biaxially oriented polyethylene terephthalate film.

4. The film of claim 2 wherein said alkylene glycol is ethylene glycol.

5. The film of claim 2 wherein said sulfomonomer is present at a level of from about 7 to about 10 mole percent and is selected from the group consisting of sodium sulfoterephthalic acid, sodium 5-sulfoisophthalic acid, sodium sulfophthalic acid, 5(p-sodiosulfophenoxy)-isophthalic acid, 5-(sulfopropoxy) isophthalic acid, sodium salt; and their polyester forming equivalents.

6. The film of claim 5 wherein said copolyester primer coating further contains up to about 15 mole percent of isophthalic acid or its polyester-forming equivalents.

7. The film of claim 5 wherein said primer coating has a dry thickness within the range of about $8.0 \times 10^{-7}$ to $2.0 \times 10^{-6}$ inch.

8. The film of claim 5 wherein the acid monomers A, B and C are employed as the lower alkyl diesters.

9. The film of claim 5 wherein said aliphatic dicarboxylic acid is adipic acid.

10. The film of claim 9 wherein said sulfomonomer is dimethyl-5-sulfoisophthalate, sodium salt.

11. The film of claim 10 wherein said alkylene glycol is ethylene glycol.

12. The film of claim 2 wherein said copolyester has an acid number of less than about 10, a number average molecular weight of less than about 50,000; and a relative viscosity of greater than about 300.

13. The film of claim 11 wherein said copolyester has an acid number within the range of about 0 to 3 and a relative viscosity within the range of about 350 to about 650.

14. The film of claim 2 wherein said copolyester consists essentially of the polyester condensation product of about 70 to 73 mole percent of dimethyl terephthalate; about 20 mole percent of dimethyl adipate; about 7 to 10 mole percent of dimethyl-5-sulfoisophthalate; sodium salt; and about 100 mole percent of ethylene glycol.

* * * * *